United States Patent
Fantinuoli

(10) Patent No.: US 12,309,211 B1
(45) Date of Patent: May 20, 2025

(54) AUTOMATIC IMAGE TRANSLATION FOR VIRTUAL MEETINGS

(71) Applicant: KUDO, INC., New York, NY (US)

(72) Inventor: Claudio Fantinuoli, New York, NY (US)

(73) Assignee: KUDO, INC., New York, NY (US)

( * ) Notice: Subject to any disclaimer, the term of this patent is extended or adjusted under 35 U.S.C. 154(b) by 0 days.

(21) Appl. No.: 18/119,188

(22) Filed: Mar. 8, 2023

Related U.S. Application Data

(63) Continuation of application No. 17/373,494, filed on Jul. 12, 2021, now abandoned.

(51) Int. Cl.
*H04L 65/403* (2022.01)
*G06N 20/00* (2019.01)
*G06V 30/148* (2022.01)
*G10L 21/10* (2013.01)

(52) U.S. Cl.
CPC ........... *H04L 65/403* (2013.01); *G06N 20/00* (2019.01); *G06V 30/153* (2022.01); *G10L 21/10* (2013.01); *G06V 30/148* (2022.01)

(58) Field of Classification Search
CPC .... H04L 65/403; G06N 20/00; G06V 30/153; G06V 30/148; G10L 21/10
See application file for complete search history.

(56) References Cited

U.S. PATENT DOCUMENTS

| | | | | |
|---|---|---|---|---|
| 7,912,289 | B2 * | 3/2011 | Kansal | G06V 20/62 |
| | | | | 358/1.18 |
| 9,892,115 | B2 * | 2/2018 | Waibel | G06F 40/58 |
| 11,256,882 | B1 * | 2/2022 | Waibel | G06F 40/166 |
| 11,451,746 | B1 * | 9/2022 | Graybill | H04N 23/698 |
| 11,861,736 | B1 * | 1/2024 | Reuss | G10H 1/0008 |
| 2014/0086483 | A1 * | 3/2014 | Zhang | G06V 30/1448 |
| | | | | 382/165 |
| 2015/0120278 | A1 * | 4/2015 | Waibel | G06F 40/166 |
| | | | | 704/2 |
| 2017/0330336 | A1 * | 11/2017 | Roblek | G06F 16/434 |
| 2019/0056908 | A1 * | 2/2019 | Zabetian | G06F 3/0482 |
| 2019/0273767 | A1 * | 9/2019 | Nelson | H04M 7/0027 |
| 2020/0019787 | A1 * | 1/2020 | Fahnestock | H04H 60/372 |
| 2020/0026766 | A1 * | 1/2020 | Ji | G06V 30/153 |
| 2020/0226208 | A1 * | 7/2020 | Subramanian | G06V 20/635 |
| 2020/0273477 | A1 * | 8/2020 | Kwatra | G10L 15/02 |
| 2020/0320162 | A1 * | 10/2020 | Bohannon | G06F 40/151 |

(Continued)

OTHER PUBLICATIONS

Non-Final Office Action on U.S. Appl. No. 17/373,494 DTD Dec. 9, 2022.

*Primary Examiner* — Oleg Survillo
*Assistant Examiner* — Abdelbasst Talioua
(74) *Attorney, Agent, or Firm* — Foley & Lardner LLP

(57) ABSTRACT

Disclosed herein are methods and systems to translate text on images shared between participants online to the preferred language of the viewer. The system determines the material shared between participants. The system then uses optical character recognition (OCR) to determine which portion of the shared image is text. The system translates the text into the preferred language of the viewer and overlays the translated text onto the image. The system monitors the shared screen to determine a revision in the image. When a revision is detected, the system finds and translates the text to the preferred language of the viewer.

20 Claims, 11 Drawing Sheets

(56) References Cited

U.S. PATENT DOCUMENTS

| | | | |
|---|---|---|---|
| 2020/0372902 A1* | 11/2020 | Takami | G03B 21/62 |
| 2021/0012289 A1* | 1/2021 | Hsieh | H04L 65/403 |
| 2021/0135892 A1* | 5/2021 | Ghanaie-Sichanie | H04L 12/1831 |
| 2021/0334478 A1* | 10/2021 | Greenberg | G10L 15/005 |
| 2021/0374362 A1 | 12/2021 | Shin et al. | |
| 2021/0406481 A1* | 12/2021 | Spence | G06F 40/58 |
| 2022/0051656 A1* | 2/2022 | Rathnam | G06F 40/58 |
| 2022/0096937 A1* | 3/2022 | Dorn | A63F 13/79 |
| 2022/0222449 A1* | 7/2022 | Zotto | H04N 7/15 |

* cited by examiner

AUTOMATIC IMAGE TRANSLATION FOR VIRTUAL MEETINGS

CROSS-REFERENCE TO RELATED APPLICATIONS

This application is a continuation of U.S. patent application Ser. No. 17/373,494, filed Jul. 12, 2021, which is incorporated by reference in its entirety.

TECHNICAL FIELD

This application relates generally to using automatic image translation to translate images, such as image text, into the language of the viewer.

BACKGROUND

Many meetings and online presentations occur across multiple geographies and languages. In multi-language videoconferencing platforms, the foreign language participants are not able to understand the textual content slides or images shown by the speaker. Even in cases where there is an interpreter, the speaker's spoken word may be interpreted but the text on slides in a presentation are not translated. Conventional software solutions require presenters or participants to translate the files shared in advance of the presentation. Therefore, conventional software solutions may shift the burden of identifying files to be translated to the participants, who may not be in possession of the presentation. As a result, conventional software solutions do not account for content shared via screen-sharing.

SUMMARY

Conventional software solutions may be unable to translate slides of a presentation in real time as the presentation progresses or determine when screen-sharing content changes and thus new content needs to be translated. For at least these reasons, there is a need for a software solution to automatically determine that a participant of a virtual meeting is sharing some content without requiring the participant or the speaker to identify content to be translated in advanced of the content being shared with the participant. Disclosed herein are methods and systems that automatically identify whether a participant is sharing electronic content in a virtual meeting by analyzing a visual attribute of the virtual meeting, translating the shared content, monitoring to determine whether new content is being presented (e.g., the presenter has moved to a new slide of the presentation), and translating the modified content (e.g., new slide).

In an embodiment, a method comprises executing, by a processor, a machine-learning model. The machine-learning model may identify visual presentation content shared between participants during an electronic communication session. The machine-learning model may utilize an image segmentation protocol to decouple a region of the visual presentation content from other visual elements shared during the electronic communication session. The machine-learning model may execute an image recognition protocol to identify a first set of words of the visual presentation content displayed within the region. The first set of words may be in a first language.

The method may comprise presenting, by the processor as an overlay on at least a portion of the region during the electronic communication session, a second set of words, in a second language, corresponding to the first set of words.

The method may comprise monitoring, by the processor, a set of pixels within the region to identify a visual revision within the region that satisfies a threshold. In response to detecting the visual revision, the method may comprise executing, by the processor, the image recognition computer model to identify a third set of words within the region having the visual revision. The third set of words may be in the first language. The method may include presenting, by the processor within the overlay, a fourth set of words, in the second language, corresponding to the third set of words.

In another embodiment, a method comprises determining, by a processor, visual presentation content shared between participants during an electronic communication session. In some embodiments, the method comprises receiving information regarding the visual presentation content shared between participants. In some embodiments, the method comprises determining by querying application programming interfaces (APIs), data logs, or other means the visual content shared between the participants. In some embodiments, the method comprises determining the area of the screen in which the presentation content is shared by means such as querying APIs and data logs to determine the presentation area or by determining a color difference or border at the boundary of the presentation, for instance, by scanning pixels on the screen. In some embodiments, the method comprises executing, by a processor, a machine-learning model to identify visual presentation content shared between participants during an electronic communication session. The machine-learning model may utilize an image segmentation protocol to decouple a region of the visual presentation content from other visual elements shared during the electronic communication session.

The method may include executing an image recognition protocol to identify a first set of words of the visual presentation content displayed within the region, wherein the first set of words is in a first language. The method may include presenting, by the processor as an overlay on at least a portion of the region during the electronic communication session, a second set of words, in a second language, corresponding to the first set of words.

The method may include monitoring, by the processor, a set of pixels within the region to identify a visual revision within the region that satisfies a threshold. In response to detecting the visual revision, the method may include executing, by the processor, the image recognition computer model to identify a third set of words within the region having the visual revision, and wherein the third set of words is in the first language. The method may include presenting, by the processor within the overlay, a fourth set of words, in the second language, corresponding to the third set of words.

In some embodiments, the processor may present at least one of the first set of words or the second set of words in real time. In some embodiments, the machine-learning model may be trained to identify the visual presentation content based on a color difference between the visual presentation content and/or other visual elements shared during the electronic communication session.

The method may further include presenting, by the processor within the overlay, an identification of a presenter sharing the visual presentation content during the electronic communication session. The method may further included presenting, by the processor within the overlay, a transcript of an audio shared during the electronic communication session.

In some embodiments, the visual revision is a change in the first set of words. The method may include identifying a set of pixels forming the first set of words. In some embodiments, the set of pixels monitored comprise at least a subset of the pixels used to form the first set of words.

In yet another embodiment, a computer system comprises a server comprising a processor and a non-transitory computer-readable medium containing instructions that when executed by the processor causes the processor to perform operations. The operations may include executing a machine-learning model to identify visual presentation content shared between participants during an electronic communication session. The machine-learning model may utilize an image segmentation protocol to decouple a region of the visual presentation content from other visual elements shared during the electronic communication session. The machine-learning model may identify a first set of words of the visual presentation content displayed within the region, wherein the first set of words is in a first language.

The computer system may execute instructions to present as an overlay on at least a portion of the region during the electronic communication session, a second set of words, in a second language, corresponding to the first set of words. The computer system may execute instructions to monitor a set of pixels within the region to identify a visual revision within the region that satisfies a threshold. In response to detecting the visual revision the computer system may execute instructions to identify a third set of words within the region having the visual revision, wherein the third set of words is in the first language. The computer system may present within the overlay, a fourth set of words, in the second language, corresponding to the third set of words.

In another embodiment, a computer system comprises a processor in communication with an artificial intelligence model and an electronic device. The processor may be configured to identify visual presentation content shared between participants during an electronic communication session. The system may utilize a machine-learning model. The machine-learning model may utilize an image segmentation protocol to decouple a region of the visual presentation content from other visual elements shared during the electronic communication session. The system may identify a first set of words of the visual presentation content displayed within the region, wherein the first set of words is in a first language.

The system may present as an overlay on at least a portion of the region during the electronic communication session, a second set of words, in a second language, corresponding to the first set of words. The system may monitor a set of pixels within the region to identify a visual revision within the region that satisfies a threshold. In response to detecting the visual revision, the system may identify a third set of words within the region having the visual revision, wherein the third set of words is in the first language; and present within the overlay, a fourth set of words, in the second language, corresponding to the third set of words.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1:
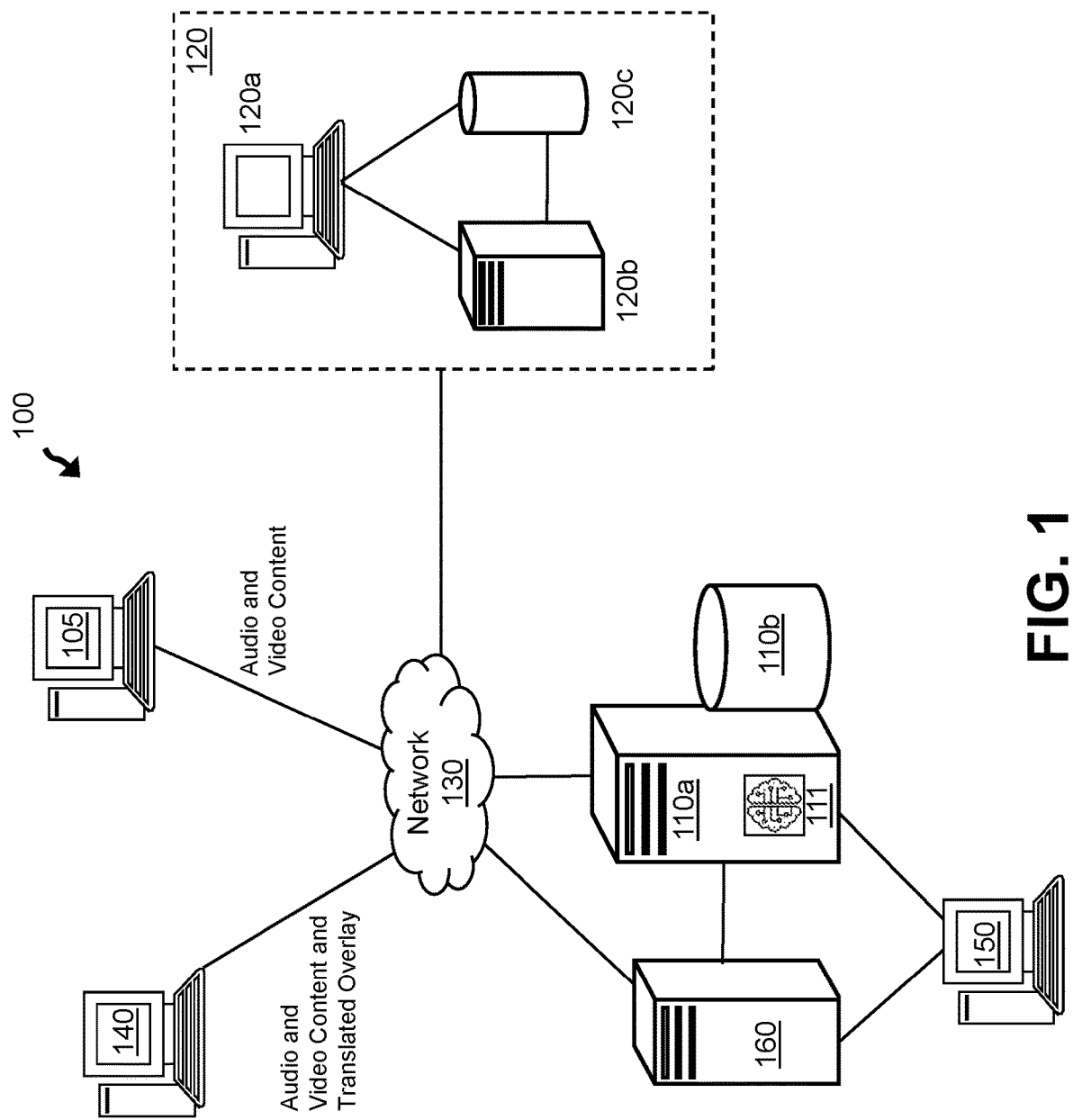
FIG. 1 illustrates components of an automated image translation system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

A virtual meeting (or online meeting) is a meeting that occurs online rather than physically with all the participants in the same meeting room. Various types of tools may support such virtual meetings. Web presentation, also known as webcasting, includes tools that support presentations during meetings to a dispersed (remote) audience. Typical features of a web presentation tool include audio conferencing, screen sharing, whiteboard platform, and chat. Additional features may include file sharing, video sharing, archiving capability, permission level setting by participant (e.g., ability to switch presenters), and interruption tools. Video conferencing allows virtual teams to see each other while meeting from remote locations. Many of the features of video conferencing overlap with web presentation tools such as file sharing, screen sharing, whiteboard platform, and chat. Video conferencing typically includes a presentation mode, which enables a given participant to control a meeting. Audio conferencing allows multiple persons and locations to hold real-time meetings via audio call in which all participants dial into a central system. Commonly employed features include Voice over Internet Protocol (VOIP) support and conference-bridge.

Online meeting tools may support specialized services. Mind mapping tools allow for visual organization of ideas. Key features include online visualization and support of multiple data types, including images, spreadsheets, and text. Group authoring tools facilitate writing and editing of documents by multiple people. Key features include version control, real-time collaboration, and support of multiple platforms. Group modeling tools are similar to group authoring tools in that they allow for multiple people to contribute to the creation of a single document or artifact, typically including graphical representations of ideas and data.

Many meetings and online presentations occur across multiple geographies and languages. In multi-language videoconferencing platforms, the foreign language participants may not be able to understand the content of the slides presented by the speaker. Even in cases where there is an interpreter, only the speaker's spoken word is interpreted but the slides in the presentation are not translated. Currently, no tool exits that will automatically translate slides to the preferred language of the viewer as the slide presentation progresses in real-time. A real-time translation of the slide allows a better user experience for people not sharing the same language as the speaker.

Embodiments disclosed herein may automatically translate the textual parts of a presentation shared in an online meeting platform into the target language selected by the user. In some embodiments, the presentation is detected, a screenshot is captured, and the textual part of the presentation is extracted. The extraction may occur by means of optical character recognition (OCR). Once extracted, the textual part may be translated by means of machine translation. The translation may then be overlaid on the presentation and shown to the event participant. In some embodiments, the system may automatically detect when an image, such as a presentation's slide, changes to a next slide. Once the system has determined that the image has changed, the process is reiterated to translate any text on the next slide.

As will be described below, a server (referred to herein as the analytics server) can train an AI model (e.g., neural network or other machine-learning models) to determine the boundaries of the shared image and/or when the visual image has changed using historical samples of shared images. The analytics server can then translate the shared content and update the translation to reflect new content shared during a presentation. The translated content may be displayed on a participant's computer as an overlay on the original content in an attempt to preserve the formatting of the original presentation.

FIG. 1 is an example of components of a system in which the analytics server operates. Various other system architectures that may include more or fewer features may utilize the methods described herein to achieve the results and outputs described herein. Therefore, the system depicted in FIG. 1 is a non-limiting example.

FIG. 1 illustrates components of an automated image translation system 100. The system 100 may include a speaker device 105, an analytics server 110a, system database 110b, AI models 111, electronic data sources 120a-d (collectively electronic data sources 120), end user device 140, administrator computing device 150, and platform server 160. Various features depicted in FIG. 1 may belong to a user and/or to the organization generating the language. The system 100 is not confined to the components described herein and may include additional or other components, not shown for brevity, which are to be considered within the scope of the embodiments described herein.

In this illustration, speaker device 105 receives an input from a speaker, which may be transmitted over the network 130 in an audio feed throughout a presentation using an application executed using platform server 160. The speaker device 105 may also present video or visual content, such as a slide presentation. This content is also transmitted from the speaker device 105 over the network and shown to end user device(s) 140 as it is shared by the speaker device 105. The speaker device 105 may be any computing device comprising a processor and a non-transitory machine-readable storage capable of performing the various tasks and processes described herein. Non-limiting examples of the speaker device 105 may be a workstation computer, laptop computer, tablet computer, and server computer. The audio and visual content is transmitted by the speaker device 105 to be presented by end user device 140 along with translated content from the analytics server 110a.

The above-mentioned components may be connected to each other through the network 130. Examples of the network 130 may include, but are not limited to, private or public LAN, WLAN, MAN, WAN, and the Internet. The network 130 may include wired and/or wireless communications according to one or more standards and/or via one or more transport mediums. The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, for example, a GSM (Global System for Mobile Communications), CDMA (Code Division Multiple Access), EDGE (Enhanced Data for Global Evolution) network.

Platform server 160 may host the online screen-sharing application, which may be executed via a web browser or other standalone application. The application may allow the speaker device 105 to send and receive audio, video, and other data (e.g., messages, text) via a graphical user interface of the application. The end user device 140 may also send and receive audio, video, and other data (e.g., messages, text) via a graphical user interface of the application. In operation, a user may execute an Internet browser and/or a local platform application that accesses platform server 160 in order to send and receive various categories of information for online meeting services. Each user may register on the local platform application installed on the respective end user device 140. If the user already has an account, then the participant electronic device 140 may transmit credentials from a user interface to the platform server 160, from which the platform server 160 may authenticate the user and/or determine a user role. In an embodiment, the user devices 140 exchange audio, video, data, and control (AVDC) information through the network 130.

End-user devices 140 may be any computing device comprising a processor and a non-transitory machine-readable storage medium capable of performing the various tasks and processes described herein. Non-limiting examples of an end-user device 140 may be a workstation computer, laptop computer, tablet computer, and server computer. The user electronic devices 140 may receive real-time input speech signals in the form of streaming audio. The streaming audio may incorporate various audio codecs such as AAC, MP3, OGG, ALAC, AMR, OPUS, VORBIS, or the like. In operation, various users may use end-user devices 140 to access the GUI operationally managed by the analytics server 110*a*. The user electronic device 140 may be any computing device allowing a participant/user to interact with a network 130, such as a conferencing server. Each user electronic device 140 may be operated by a respective participant or a user during an electronic communication session associated with an online meeting. The terms participant and user may be used interchangeably throughout this disclosure. The examples of the computing device may include, but are not limited to, a cellular phone, a mobile phone, a desktop computer, a laptop, a personal digital assistant (PDA), a smartphone, a tablet computer, a smart watch, and the like. Although FIG. 1 depicts a single end user device 140, it is intended that one or more end user devices may be utilized in this system.

The speaker device 105 and the end user device 140 may be configured to generate input visual signals containing audio data of participant utterances during an online meeting. For example, one or more speaker devices may generate visual images or slides during a live oral presentation and/or a conversation among multiple participants in an electronic communication session associated with an online meeting.

The analytics server 110*a* may be configured to identify a portion of a display that is sharing content, translate the shared content, generate an overlay for the translated content, and identify new content for translation. Although shown as a separate component from platform server 160, the analytics server 110*a* may be integrated with or communicate directly with the platform server 160. For example, the functionality described herein may be performed within the application from platform server 160. Alternatively, functionality may be performed in part on platform server 160 and in part on a separate analytics server 110*a*.

The analytics server 110*a* may host a website accessible to users operating any of the electronic devices described herein (e.g., end-users), where the content presented via the various webpages may be controlled based upon each particular user's role or viewing permissions. The end user device 140 may access the website to select a desired language. The administrator device 150 may access the website for other configurations of the analytics server 110*a*. The analytics server 110*a* may be any computing device comprising a processor and non-transitory machine-readable storage capable of executing the various tasks and processes described herein. Non-limiting examples of such computing devices may include workstation computers, laptop computers, server computers, and the like. While the system 100 includes a single analytics server 110*a*, the analytics server 110*a* may include any number of computing devices operating in a distributed computing environment, such as a cloud environment.

The analytics server 110*a* may execute various computer models 111 (including artificial intelligence and/or machine-learning models) to identify the portion of the screen holding the relevant image. More specifically, the analytics server may segment the image to determine the portion of the screen that is, for example, a presentation.

In a non-limiting example of operation, a meeting participant operating user device 140 may access the platform and request that the text on slides shared during an electronic meeting session from speaker device 105 via platform server 160 be translated into a preferred language. The analytics server 110*a* may utilize the methods and systems described herein to detect and translate the words on the slides and overlay the translated words on the participant's view of the slides.

The analytics server 110*a* may presents information based upon a particular user's role within the system 100. In such implementations, the user's role may be defined by data fields and input fields in user records stored in the system database 110*b*. The analytics server 110*a* may authenticate the user and may identify the user's role by executing an access directory protocol (e.g., LDAP). The analytics server 110*a* may generate content that is customized according to the user's role defined by the user record in the system database 110*b*. For example, based on the user's role in an access directory protocol, the analytics server may determine a preferred language for that user and translate content into that language for the user.

The analytics server 110*a* may use AI to identify a portion of a shared screen that contains content to be translated. This functionality may be useful for a configuration where the analytics server 110*a* operates separately from the platform server 160. The analytics server 110*a* may operate in conjunction with various platform servers 160 and their associated applications, so the portion of the display for translation may not be consistent amongst the various applications. When determining a portion of the display to translate, the analytics server will want to exclude any portion that includes video of a user (e.g., which may include the user's name) as well as any text on the application itself (e.g., "File," "Participants," "Share"). By limiting the area of the display to translate, the analytics server can operate more efficiently. Alternatively, in those configurations where the analytics server functionality is embedded or integrated into the application of platform server 160, the application may have designated a portion of the display that is to be translated.

The analytics server 110*a* also translates the text shown on the display and generate translated text to display as an overlay on the original text. In some configurations, the overlay may be presented as an overlay on top of the original text such that the end user device 140 displays the translated text. In other configurations, the translated text is embedded into the video stream to display an integrated image that includes the translated text. Although the example embodiment recites an overlay, it is intended to include any configuration where the translated text is presented in the place of the original text. The translated text may also be presented in a format similar to or identical to the original text to maintain the presentation look and feel. The analytics server 110*a* may use AI to capture the look and feel, such as detecting a font, font size, and textual layout. The analytics server 110*a* will then reproduce the text in a translated format that attempts to resemble the original text appearance.

In operation, the analytics server 110*a* may use the retrieved documents to generate a training dataset and to train the AI models 111. In some embodiments, a user operating the computer 120*a* may access a platform and label the data (e.g., indicate whether the shared visual region was correctly determined). For instance, the analytics server 110*a* may display the determined shared visual region on the platform discussed herein where human reviewers can manually label the data indicating whether the determined shared visual region is correct within an acceptable tolerance. In other embodiments, the analytics server 110*a* may automatically label the data by analyzing the data and determining whether the determined shared visual region is acceptable. Using the generated training dataset, the analytics server 110*a* may train the AI model 111.

The analytics server 110*a* may use these labels as ground truth and generate a training dataset accordingly. The analytics server 110*a* may then train the AI models 111 using various training protocols (e.g., supervised method, unsupervised method, or semi-supervised method).

The analytics server 110*a* may store AI models 111 (e.g., neural networks, random forest, support vector machines, etc.) that are trained to predict the area of the screen shared between participants and when a revision of the area occurs. The analytics server 110*a* may train the AI models 111 using data already associated with previous sessions and shared images.

The analytics server 110*a* may then generate one or more sets of labeled (or sometimes unlabeled) training dataset from previous sessions. The analytics server 110*a* may input the set of labeled training data into the stored AI models 111 for training (e.g., supervised, unsupervised, and/or semi-supervised) to train the AI models 111 to determine the visual presentation shared between participants. The analytics server 110*a* may continue to feed the training data into the AI models 111 until the AI models 111 are accurate to a desired threshold and store the AI models 111 in a database, such as the database 110*b*. In the illustration of FIG. 1, AI models 111 are shown as being executed by the analytics server 110*a*, but may be stored on analytics server 110*a* or system database 110*b*.

The analytics server 110*a* may also monitor the electronic communication session and user interactions to determine whether the translated words predicted by the trained AI models 111 were acceptable to the participants of the electronic communication session. The analytics server 110*a* may include the monitored data in an additional training dataset to further re-calibrate the AI models 111.

The administrator computing device 150 may represent a computing device, such as a workstation computer, operated by a system administrator. The administrator computing device 150 may be configured to display data retrieved by the analytics server 110*a* (e.g., various analytic metrics) where the system administrator can monitor various models 111 utilized by the analytics server 110*a*, electronic data sources 120, speaker device 105, and/or end-user devices 140; review feedback; and/or facilitate training or calibration of the neural networks that are maintained by the analytic server 110*a*. In operation, the analytics server 110*a* may retrieve various images and other associated data (e.g., the shared visual region or text associated with the images) from the electronic data sources 120. For instance, the analytics server 110*a* may query the server 120*b* to retrieve electronic documents such as images stored onto the database 120*c*. For example, the electronic documents may correspond to images of screens including a shared visual region and additional regions along with the associated extracted shared visual region.

Figure 2:
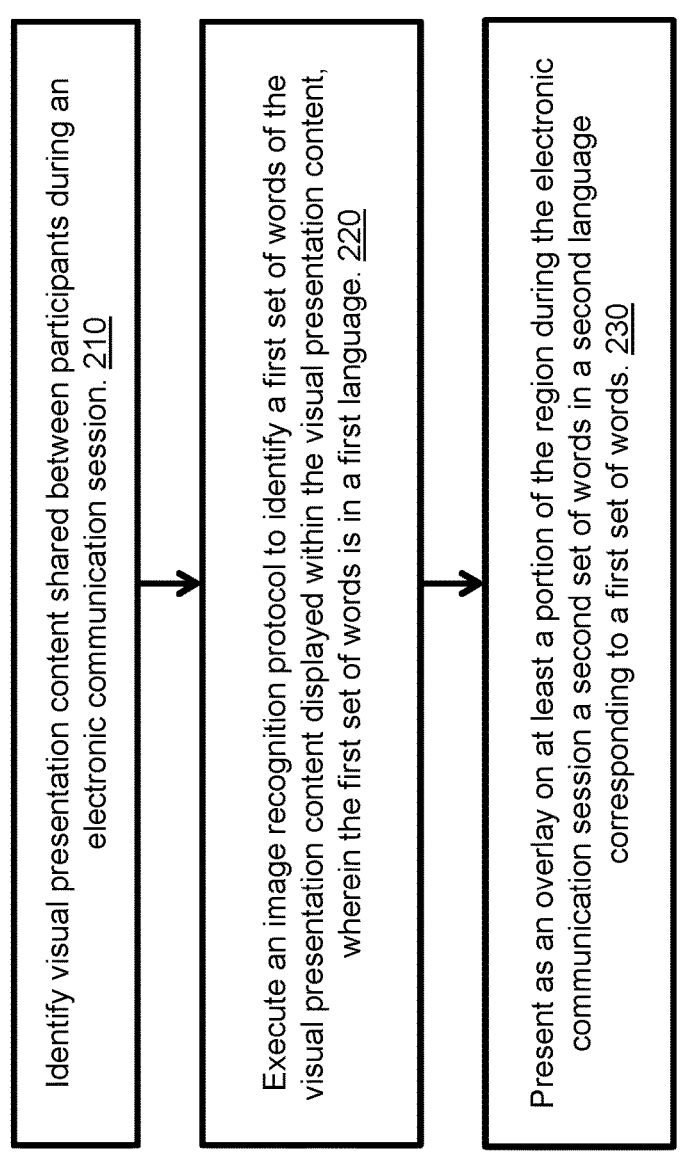
FIG. 2 illustrates a flow diagram of a process executed in an automated image translation system, according to an embodiment.

FIG. 2 illustrates a flow diagram of a process executed in an automated image translation system, according to an embodiment. The method 200 includes steps 210-230. However, other embodiments may include additional or alternative steps, or may omit one or more steps altogether. The method 200 is described as being executed by an analytics server, such as the analytics server 110*a* described in FIG. 1). However, one or more steps of method 200 may be executed by any number of computing devices operating in the distributed computing system described in FIG. 1. For instance, one or more computing devices may locally perform part or all of the steps described in FIG. 2 or a cloud device may perform such steps.

At step 210, the analytics server may identify visual presentation content shared between participants during an electronic communication session. The visual presentation content may be a video, an image, a slide, or other visual content shared via an electronic communication platform. The analytics server receive visual presentation content from the platform server. In one configuration, the visual presentation content is transmitted along with data regarding the dimensions, area and center point, pixels, area boundary, or other methods of representing the visual presentation content in an image. The analytics server may identify the visual presentation content by querying the platform, such as by using an API or data log, to determine the shared visual presentation content or the area on an image of the shared visual presentation content. In another configuration, the analytics server may identify the particular electronic communication session platform and use the typical layout corresponding to the electronic communication platform to determine the shared visual presentation content on an image. For instance, a particular platform may typically utilize a particular location for a window depicting the shared visual presentation content. For instance, in FIG. 5, the dashed box 550 may denote a portion of the shared visual region that may be consistent throughout a presentation for a particular electronic communication session platform. In this case, if the analytics server detects an electronic communication session in that platform, it may identify the visual presentation as the central 80% of the platform window. The analytics server may identify the visual presentation content by image segmentation of the user's screen image, such as by determining a solid boundary around the visual presentation content or by determining a color change denoting the boundary of the shared visual presentation area.

In an alternative configuration, the analytics server may identify the visual presentation content by training a machine-learning model to determine the visual presentation content from the visual content, e.g., a screen shot or image of a video or a presentation. In some embodiments, the analytics server may utilize the methods outlined above as a starting position for identifying the visual presentation content and refine the identification of the visual presentation content using machine-learning.

The analytics server may access an AI model (e.g., neural network, convolutional neural network, or any other machine-learning model such as random forest or a support vector machine) trained based on a training dataset corresponding to previous electronic communication sessions. Before accessing or executing the AI model, the analytics server may train the AI model using data from previous sessions. The analytics server may train the AI model using various machine-learning methodologies. The analytics server may train the AI model using supervised, semi-supervised, and/or unsupervised training or with a reinforcement learning approach. The analytics server may continue this training process until the AI model is sufficiently trained (e.g., accurate above a predetermined threshold). The computer may store the AI model in memory, in some cases upon determining the AI model has been sufficiently trained.

Additionally or alternatively, the analytics server may train the AI model to determine the shared visual presentation in contrast to other aspects of the application or display that represent application menus, buttons, options, configurations, participants, or the like. As a result, the trained AI model is able to accurately predict which portion of an image is the shared image and when a revision to the image has occurred. The analytics server may continue training the AI model until a predetermined threshold has been met. The AI model may be a multi-layered series of neural networks arranged in a hierarchical manner. The AI model may perform various preprocessing protocols to de-noise the screen images before analyzing them.

The analytics server may train the AI model such that the AI model is customized to predict values associated with the corresponding training dataset. For instance, if the analytics server trains an AI model using a training data set specific to an electronic communication platform, the predicted image region may be determined using a training dataset corresponding to the electronic communication platform. For instance, electronic communication platforms such as Zoom or Microsoft Teams may have a typical layout influencing the predicted image region.

Upon completion of training, the AI model is ready to predict the shared visual presentation. The analytics server may access the trained AI model via the cloud or by retrieving or receiving the AI model from a local data repository. For example, the analytics server may transmit a password or token to a device storing the AI model in the cloud to access the AI model. In another example, the analytics server may receive or retrieve the AI model either automatically responsive to the AI model being sufficiently trained or responsive to a GET request from the analytics server.

In addition to training the AI model as discussed above, the analytics server may use user interactions to further train and re-calibrate the AI model. When an end user performs an activity on the electronic platform that displays the results predicted via the AI model, the analytics server may track and record details of the user's activity. For instance, when a predicted result is displayed on a user's electronic device, the analytics server may monitor the user's electronic device to identify whether the user has interacted with the predicted area of the shared visual presentation by editing, deleting, accepting, or revising the area of the shared visual presentation.

The analytics server may utilize an API to monitor the user's activities. The analytics server may use an executable file to monitor the user's electronic device. The analytics server may also monitor the electronic platform displayed on an electronic device via a browser extension executing on the electronic device. The analytics server may monitor multiple electronic devices and various applications executing on the electronic devices. The analytics server may communicate with various electronic devices and monitor the communications between the electronic devices and the various servers executing applications on the electronic devices.

In a non-limiting example, the analytics server may retrieve data associated with previously executed electronic communication sessions, such as previously conducted virtual video meetings. For instance, the analytics server may query a platform server to retrieve video files associated with previously conducted video calls (virtual meetings) where electronic content was shared. Using automatic labeling protocols and human reviewers, the analytics server may label the data retrieved and generate a training dataset. The analytics server may then use the training dataset to train one or more AI models.

When trained, the AI models may segment visual attributes of the platform (virtual meeting) to identify whether electronic content is being shared without the need to receive a notification from a participant or the platform server. The AI model may distinguish the electronic content shared from other content shared (e.g., video feed of the participants).

At step 220, the analytics server may identify a first set of words of the visual presentation content displayed within the region in a first language. For instance, the analytics server may utilize an image recognition protocol such as an OCR protocol. In some embodiments, the analytics server may perform OCR on the shared visual region. In some embodiments, the analytics server may apply an OCR algorithm to determine the text characters in the shared visual region. In some embodiments, the analytics server may send the shared visual region image to a third-party application. The third-party application may determine the text in the region and return the information to the analytics server.

The image recognition protocol may identify a first set of words of the visual presentation content displayed within the visual presentation content region. For instance, the analytics server may crop the screenshot to the dimensions of the visual presentation content region. The analytics server may use OCR software to generate text for the visual presentation content region image or bitmap. Alternately, the analytics server may train a machine-learning model to detect the characters by utilizing pattern recognition and feature detection to determine text characters across backgrounds in the visual presentation content region. The AI model may be trained similarly to that discussed in step 210, however, the model may be given a corpus of characters on image backgrounds correlated with the recognized raw text. Additionally, the analytics server may sample the characters to determine the font and color of the text, as well as determine the background surrounding the text in the visual presentation region. These values may be stored with the location of the text in order to match the style of the translated text to the original text.

At step 230, the analytics server may present as an overlay on at least a portion of the region during the electronic communication session, a second set of words, in a second language, corresponding to the first set of words. In some embodiments, analytics server may execute a machine translation of the previously determined text. The analytics server may utilize any of the myriad of machine translation software and protocols known in the art. Alternately, the analytics server may translate the text using machine-learning by mapping a corpus of text in the original language to a corpus of text in the translated language using any of the machine-learning methods outlined above. Once the text is translated into the target language, the system may place the text back in the location and style of the original presentation. The system may retrieve the stored values of the text location, style, font, color, and background in order to match the translated text to the original text in the shared visual presentation. The overlay may be transmitted to the platform server for displaying along with the presentation from the platform server. In another configuration, the overlay may be generated and presented locally on the end user device.

Figure 3:
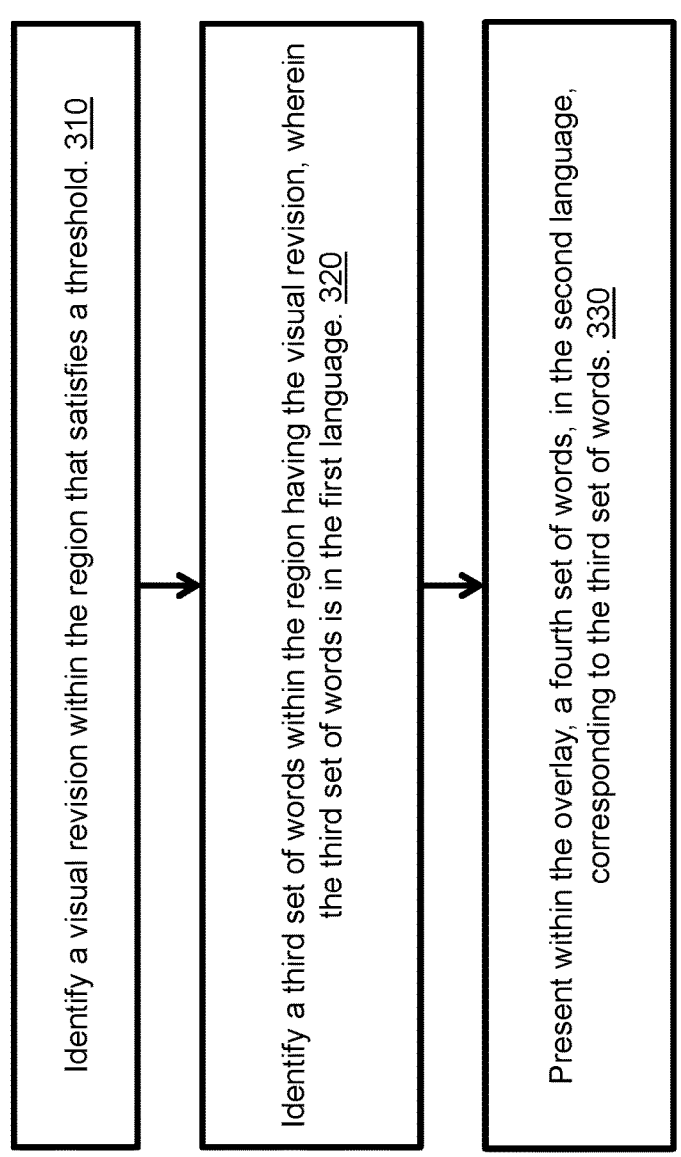
FIG. 3 illustrates a flow diagram of a process executed in an automated image translation system, according to an embodiment.

FIG. 3 illustrates a flow diagram of a process executed in an automated image translation system, according to an embodiment. The method 300 includes steps 310-330. However, other embodiments may include additional or alternative steps, or may omit one or more steps altogether. The method 300 is described as being executed by an analytics server, such as the analytics server 110*a* described in FIG. 1. However, one or more steps of method 300 may be executed by any number of computing devices operating in the distributed computing system described in FIG. 1. For instance, one or more computing devices may locally perform part or all of the steps described in FIG. 3 or a cloud device may perform such steps.

In step 310, the analytics server identifies a visual revision (or other content change) within the shared visual region that satisfies a threshold. For instance, the analytics server may detect that a presentation in the shared visual region has transitioned to another slide (or image or frame). The analytics server may do this in a variety of ways. In some embodiments, the analytics server may receive information from the electronic communication session platform that the shared visual image has changed. In some embodiments, the analytics server may query the platform, such as by utilizing an API, or use a data log to determine that the shared visual image has changed.

In some embodiments, the analytics server may monitor a set of pixels in the shared visual region and identify a visual revision when a percentage of the pixels has changed. The analytics server may perform this monitoring every 0.5 seconds, 1 second, 2 second, or other time period. In some embodiments, the pixels monitored may be pixels the analytics server detects makes up the text, for instance, by using OCR. In some embodiments, the analytics server may identify a set of pixels forming the first set of words. These pixels may be monitored to detect a change in the pixels forming the first set of words, which the analytics server may identify as a change to the shared visual image.

Additionally or alternatively, the analytics server may generate periodic screenshots from the electronic content being presented. For instance, the analytics server may generate a screenshot every one or two seconds (or any other time period defined by a system administrator or participants viewing the presentation). The analytics server may then compare the screenshot with a previously generated screenshot to determine whether content of the presentation has changed. To do so, the analytics server may utilize various visual comparison protocols, such as mean squared error (MSE) method, structural similarity index (SSI) method, or other similar protocols.

In a non-limiting example, the analytics server may use the MSE method by measuring the average of the squares of the errors (e.g., differences within a defined window of a first screenshot compared to a corresponding window within the second screenshot). In another non-limiting example, the analytics server may use the SSI method to compare the screenshots and to identify whether the presentation has been revised. The analytics server may calculate the perceived change in the structural information of the second screenshot (purportedly being a revised version of the first image), whereas using the MSE method, the analytics server may estimate the perceived errors.

If the difference between the two screenshots satisfies a threshold (e.g., predefined threshold that is revisable and empirically determined), the analytics server determines that the presentation has been revised. As a result, the analytics server may move to step 320 and translate the revised presentation.

In step 320, the analytics server identifies text on the new shared visual image. The analytics server may execute an OCR protocol to identify a third set of words displayed within the visual presentation content region. For instance, the analytics server may use OCR software to generate text to display over the visual presentation content region image or bitmap. Alternately, the analytics server may train a machine-learning model to detect the characters by utilizing pattern recognition and feature detection to determine text characters across backgrounds in the visual presentation content region. The AI model may be trained using a corpus of characters on image backgrounds correlated with the recognized raw text. Additionally, the analytics server may sample the characters to determine the font and color of the text, as well as determine the background surrounding the text in the visual presentation region. These values may be stored along with the location of the text in order to match the style of the translated text to the original text.

At step 330, the analytics server may present within the overlay, a fourth set of words, in the second language, corresponding to the third set of words. The analytics server may execute a machine translation of the previously determined text. The analytics server may utilize any of the myriad of machine translation software and protocols known in the art. Alternately, the analytics server may translate the text using machine-learning by mapping a corpus of text in the original language to a corpus of text in the translated language using any of the machine-learning methods outlined above. Once the text is translated into the target language, the system may place the text back in the location and style of the original presentation. The system may retrieve the stored values of the text location, style, font, color, and background in order to match the translated text to the original text in the shared visual presentation.

To translate the text within the presentation (or when a revision to the presentation has been identified), the analytics server may first OCR the screenshot generated from the presentation (or the revised presentation) to identify the text within the presentation. The analytics server may then use machine translation techniques to translate the identified text into a different language (e.g., language chosen by or for the participant viewing the presentation). The analytics server may insert the translated language onto the presentation. For instance, as will be described below, the analytics server may display an overlay that superimposes the translated text onto the original content of the presentation, such that the participant(s) only see the translated language instead of the same text in the original language. Alternatively, the translated text may be displayed on a separate window. For instance, the analytics server may display a graphical element (e.g., window) that displays translated content of the presentation.

Figure 4:
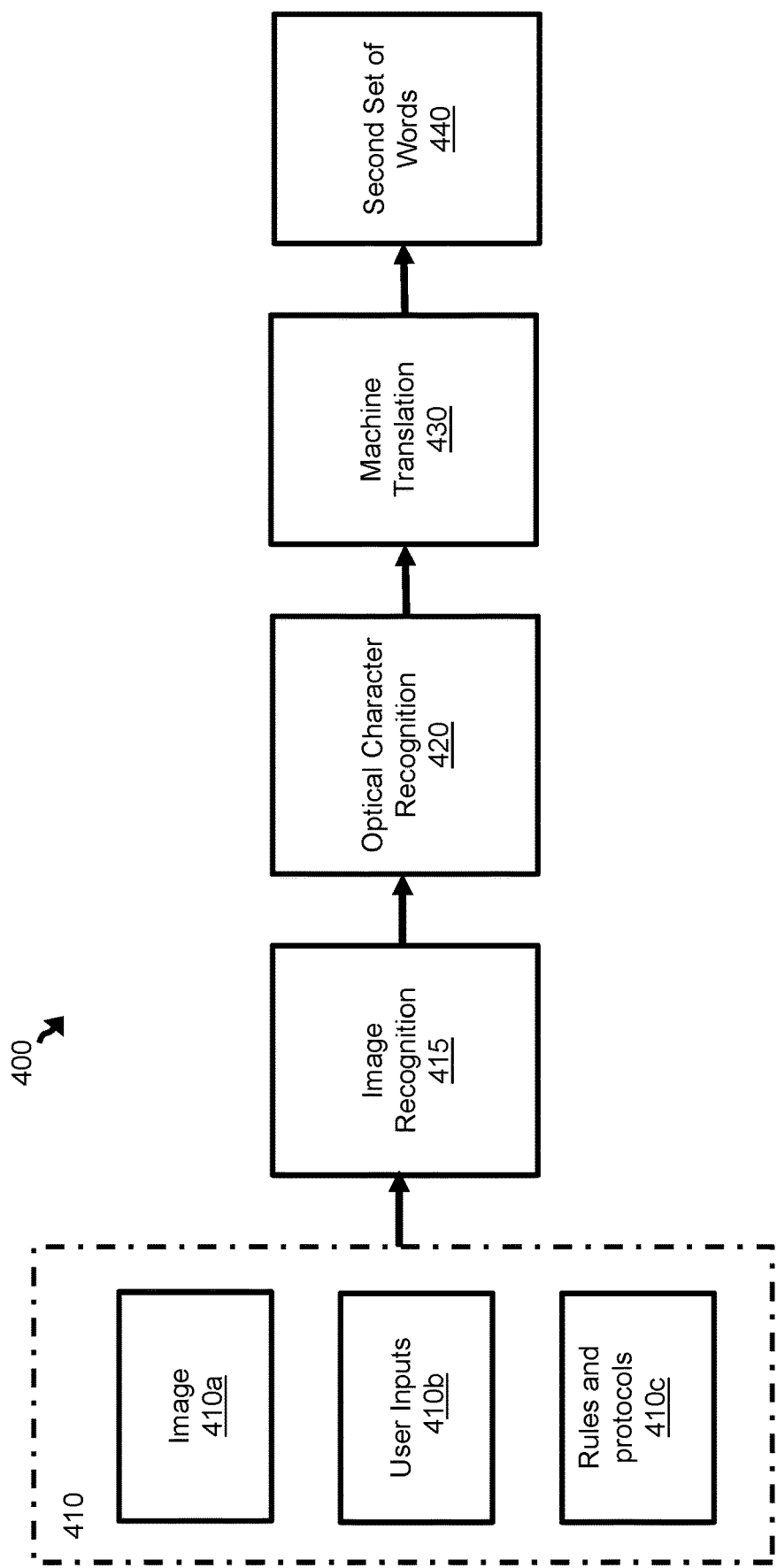
FIG. 4 illustrates a flow diagram of a process executed in an automated image translation system, according to an embodiment.

FIG. 4 illustrates a flow diagram of a process executed in an automated image translation system, according to an embodiment. The analytics server may extract or receive an image 410*a*, such as a screen shot. The screen shot may be of the complete image seen by a participant on the user device while attending the electronic communication session. This image may include the shared visual presentation and other image segments, such as the faces of participants, platform boundaries, and toolbars. The user inputs 410*b* may include the language the user prefers to use on the shared images. In some embodiments, the analytics server may train a machine-learning model using previously recorded electronic meeting sessions to determine the shared visual region. An example of a shared visual region is a presentation shared between participants.

The analytics server may execute an image recognition protocol 415 on the extracted or received image 410*a* to determine the shared visual region. Alternatively, the analytics server may receive only the shared visual region from the electronic communication session platform. The analytics server may then perform OCR 420 on the shared visual region to determine the text present in the shared visual region. The analytics server may also store characteristics such as the location, font, color and background used for the text. The analytics server may use the determined text and the user input in order to machine translate the text 430 to the preferred language of the viewer. The analytics server may then present an overlay that includes the translated text 440 on the shared visual region in the location, font, and color as the original text.

Figure 5:
FIG. 5 illustrates a graphical user interface generated and displayed in an automated image translation system, according to an embodiment.

FIG. 5 illustrates a graphical user interface generated and displayed in an automated image translation system, according to an embodiment. FIG. 5 shows an image seen by the user in an electronic communication session, which may be a slide of a presentation or a frame of a video. This image is segmented to determine the shared visual region 540 within dashed box 550, which includes text 520 ("This is a horse") in this illustration Surrounding the shared visual region are portions of the electronic communication session that are not part of the visual material shared between participants in the electronic communication session. For instance, in FIG. 5 the image presented by the platform includes a region 515 where images of participants of the electronic communication session are shown. In FIG. 5, the user interface also a toolbar 525 for interacting with, managing, and configuring the electronic communication session. Neither the portions showing the images of the participants 515 nor the toolbar 525 is part of the region shared between participants in the electronic communication session. Thus, the system will determine that these regions should be excluded from the shared visual region 540. In this case, the shared visual region 540 comprises the slide of the horse and text above the image. The analytics server may determine this shared visual region 540 using the methods disclosed herein.

Figure 6:
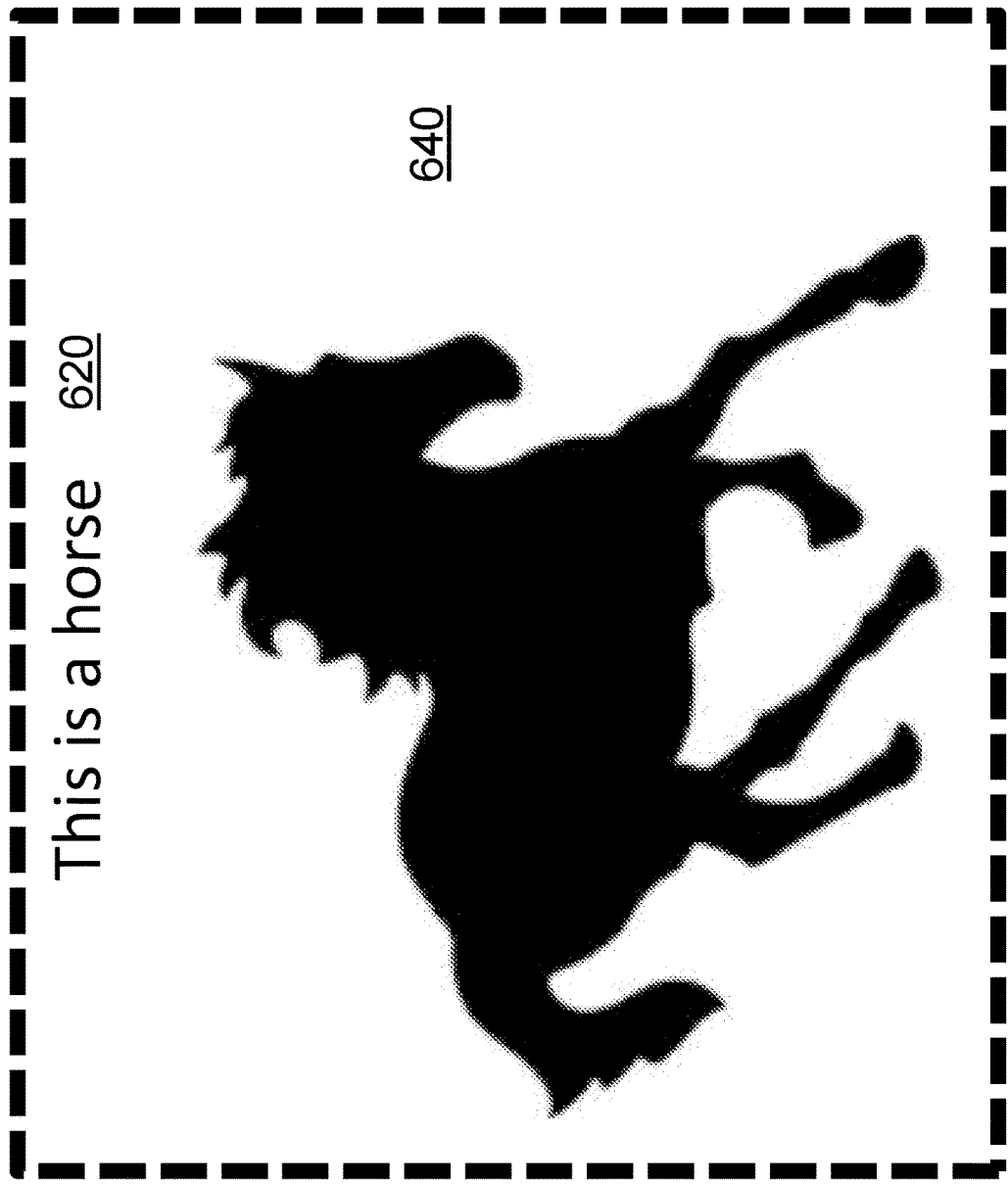
FIG. 6 illustrates a graphical user interface generated and displayed in an automated image translation system, according to an embodiment.

The system may be configured to translate only the text presented within the shared visual region, so the system may determine the portion of the display belonging to the shared visual region before translating any text. FIG. 6 illustrates a graphical user interface generated and displayed in an automated image translation system, according to an embodiment. FIG. 6 shows only the shared visual region 640, including text 620. The shared visual region 640 may be determined by receiving information from or querying the electronic communication session platform, from known data regarding a platform layout, or from data logs. The shared visual region 640 may be determined using image features such as boundaries or color changes or by training a machine-learning model.

Figure 7:
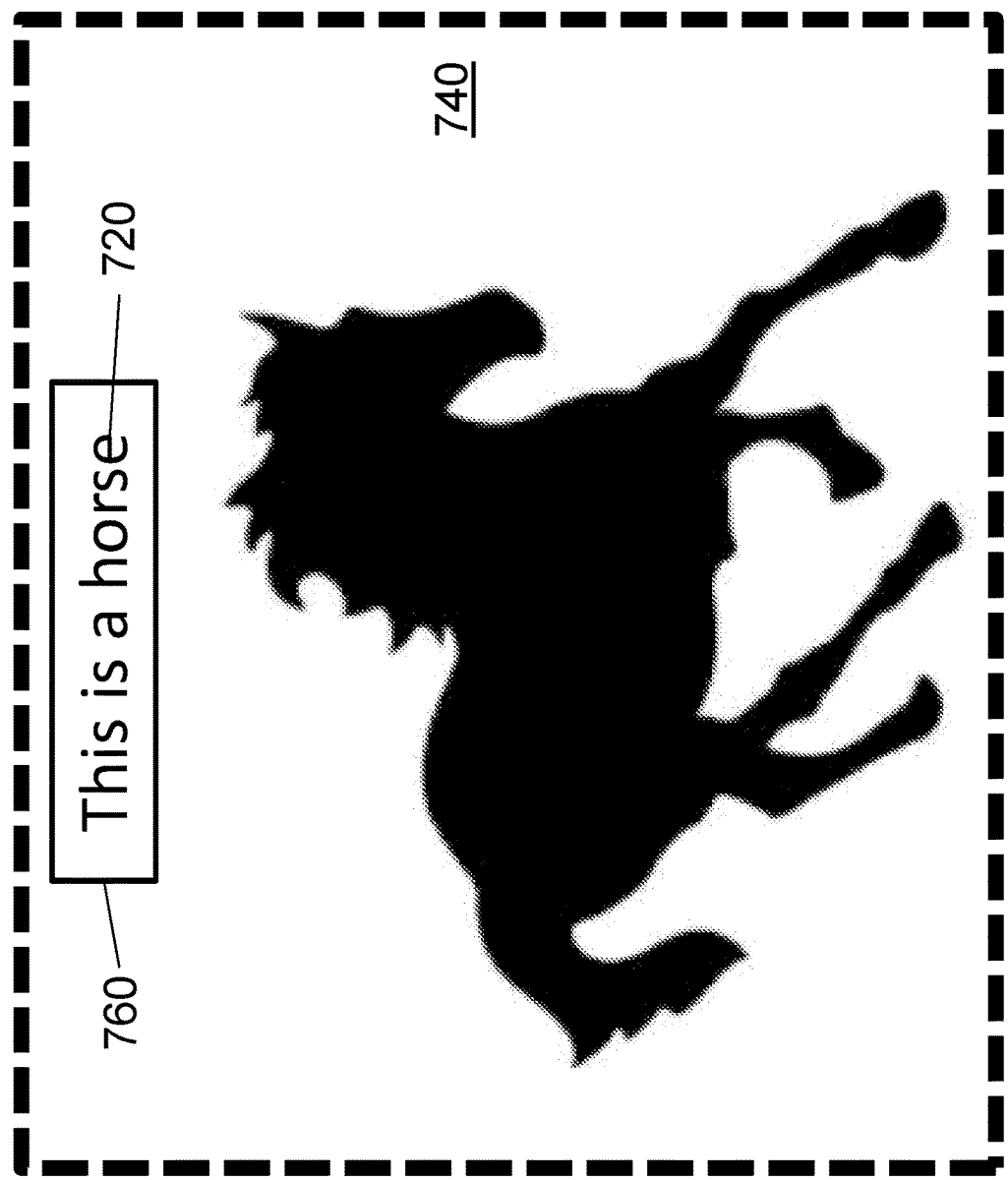
FIG. 7 illustrates a graphical user interface generated and displayed in an automated image translation system, according to an embodiment.

Once the shared visual region is determined, the system may identify the text within that region. FIG. 7 illustrates a representation of text identified in an automated image translation system, according to an embodiment. Text 720 in the shared visual region 740 may be determined using OCR. The text and region around the text represented by box 760 may be sampled for text color, font, and background color, and the location of the text may be stored. This region 760 may be marked for more frequent sampling in determining if a revision has occurred in the shared visual field.

Figure 8:
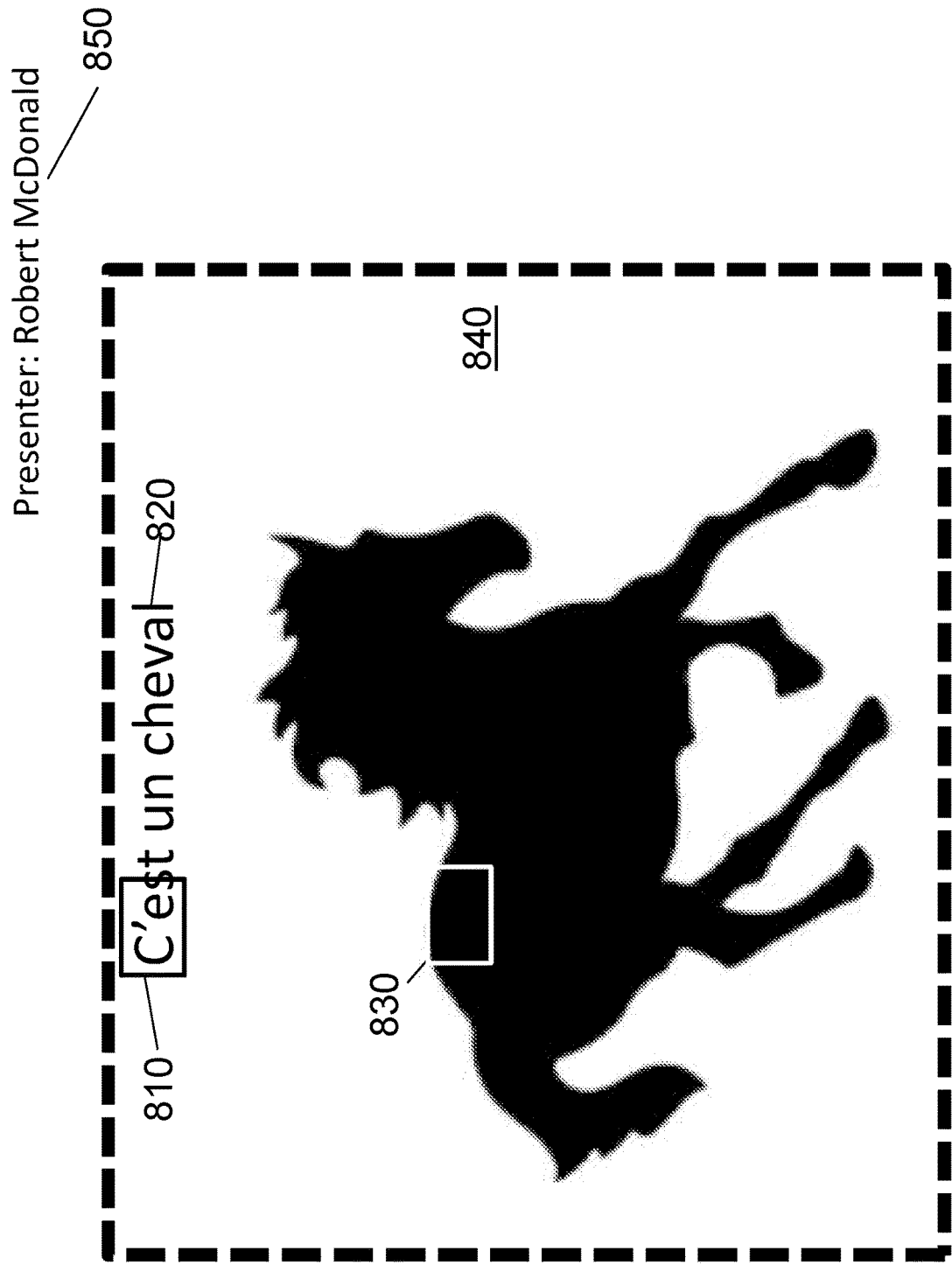
FIG. 8 illustrates a graphical user interface generated and displayed in an automated image translation system, according to an embodiment.

FIG. 8 illustrates a graphical user interface generated and displayed in an automated image translation system, according to an embodiment. In this illustration, the text (previously shown as "This is a horse") has been translated into "C'est un cheval" 820. Text 820 may be translated into the language selected by the user, for instance, using machine translation. The translated text 820 may be overlaid in a shared visual field 840 to take the place of the original text. In an embodiment, the translated text may be the same style and font as the original text and the background around the translated text may be selected to match the original background.

The system may monitor the shared visual field to determine if any changes occur, such as a new slide in a presentation, an animation, a video, or the like. In one embodiment, the system may monitor each pixel to determine if the pixel has changed. In one configuration, the system may apply a threshold to the number of changed pixels to determine if a substantial amount of the display has changed. The system may also look at how close those changed pixels are to each other to determine whether a particular region has changed. That particular region may represent a letter, number, word, or other graphic. In one embodiment, the system may use a plurality of boxes that each comprise a region of pixels to monitor. The plurality of boxes may be the same size or different sizes.

In the illustration of FIG. 8, the shared visual field is segmented into a plurality of boxes. For example, box 830 may be a region of pixels that that are part of the horse image and are mostly black. In this particular example, box 830 contains 95% black pixels. Should the amount of black pixels in box 830 change, the system may determine that the content has changed and perform the process of recognizing text and translating that text. A threshold change, e.g., 2%, may be required before determining that the content has changed. In another example, box 810 may show a subset of pixels that form a portion of the text 820. The pixels in box 810 may be monitored to determine a change to the shared visual field 840.

In some embodiments, the analytics server may detect the identity of the presenter and overlay the name of the presenter on the slide as shown at 850. The analytics server may determine the presenter by receiving information from the electronic communication session platform. The analytics server may determine the presenter by reviewing electronic data, such as data logs, or by querying the API of the electronic communication session platform. The analytics server may determine the presenter by detecting text on the image displaying the presenter, such as by using OCR techniques.

Figure 9:
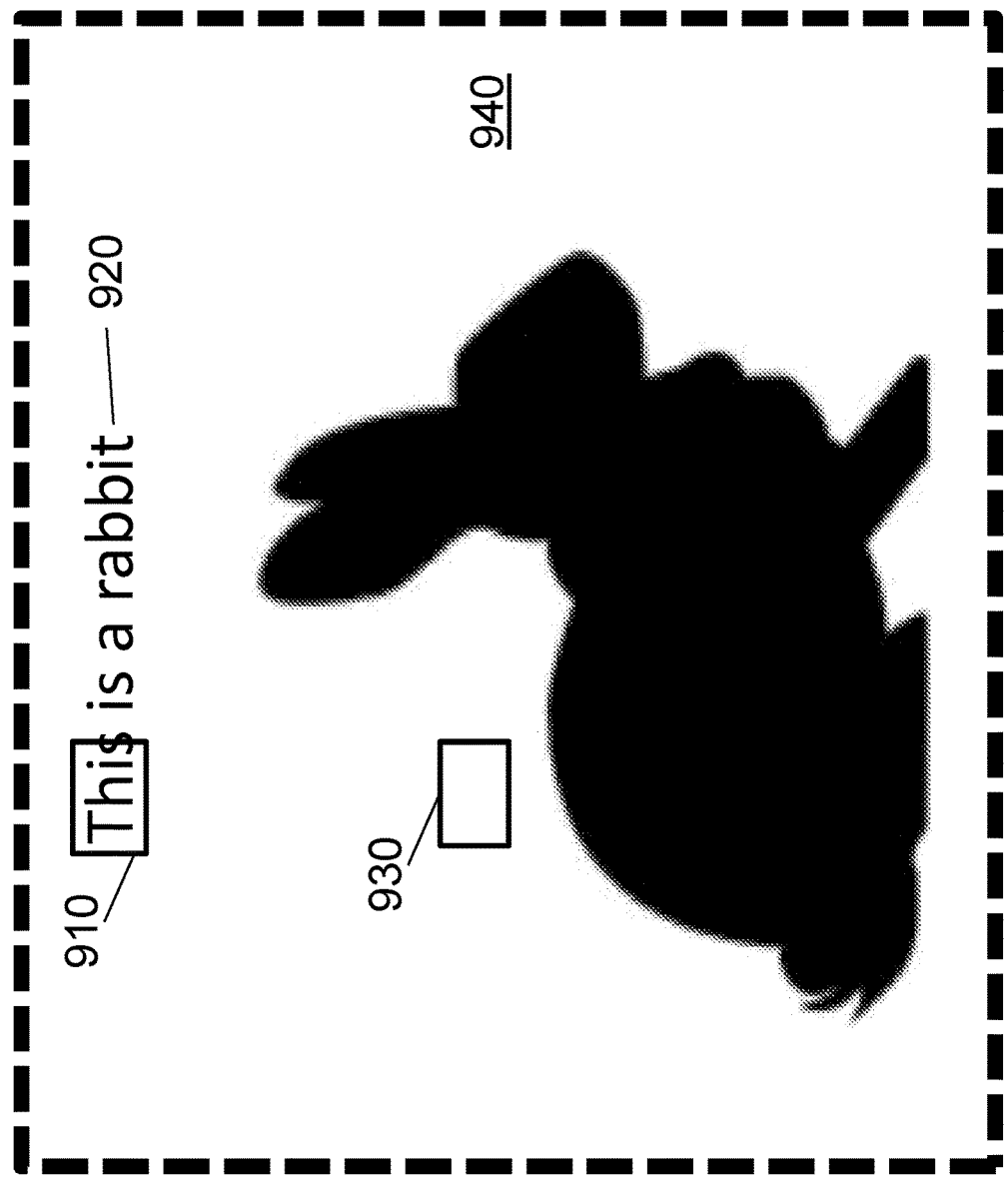
FIG. 9 illustrates a graphical user interface generated and displayed in an automated image translation system, according to an embodiment.

FIG. 9 illustrates a graphical user interface generated and displayed in an automated image translation system, according to an embodiment. In FIG. 9, a shared visual region 940 has been updated in the shared electronic communication session. In some embodiments, this is detected by data from the platform or logs. In some embodiments, this is detected by a change in the text region detected by OCR. In some embodiments, the pixels in block 910, which form a portion of text 920, may be monitored, and a change in the pixels that are black and white may be detected as the slide changes from FIG. 8 to FIG. 9. In some embodiments, this is detected by a change in a certain percentage of sampled pixels across the shared visual region. For instance, the pixels in block 930 may be monitored and the system may detect that the pixels in block 930 have changed from mostly black (in FIG. 8) to all white (in FIG. 9). In some embodiments, this is detected by a trained machine-learning model. Once the analytics server detects a change, such as the change of the pixels in block 930 from black to white, the analytics server will re-execute the methods for detecting and translating text, as shown in FIG. 2.

Figure 10:
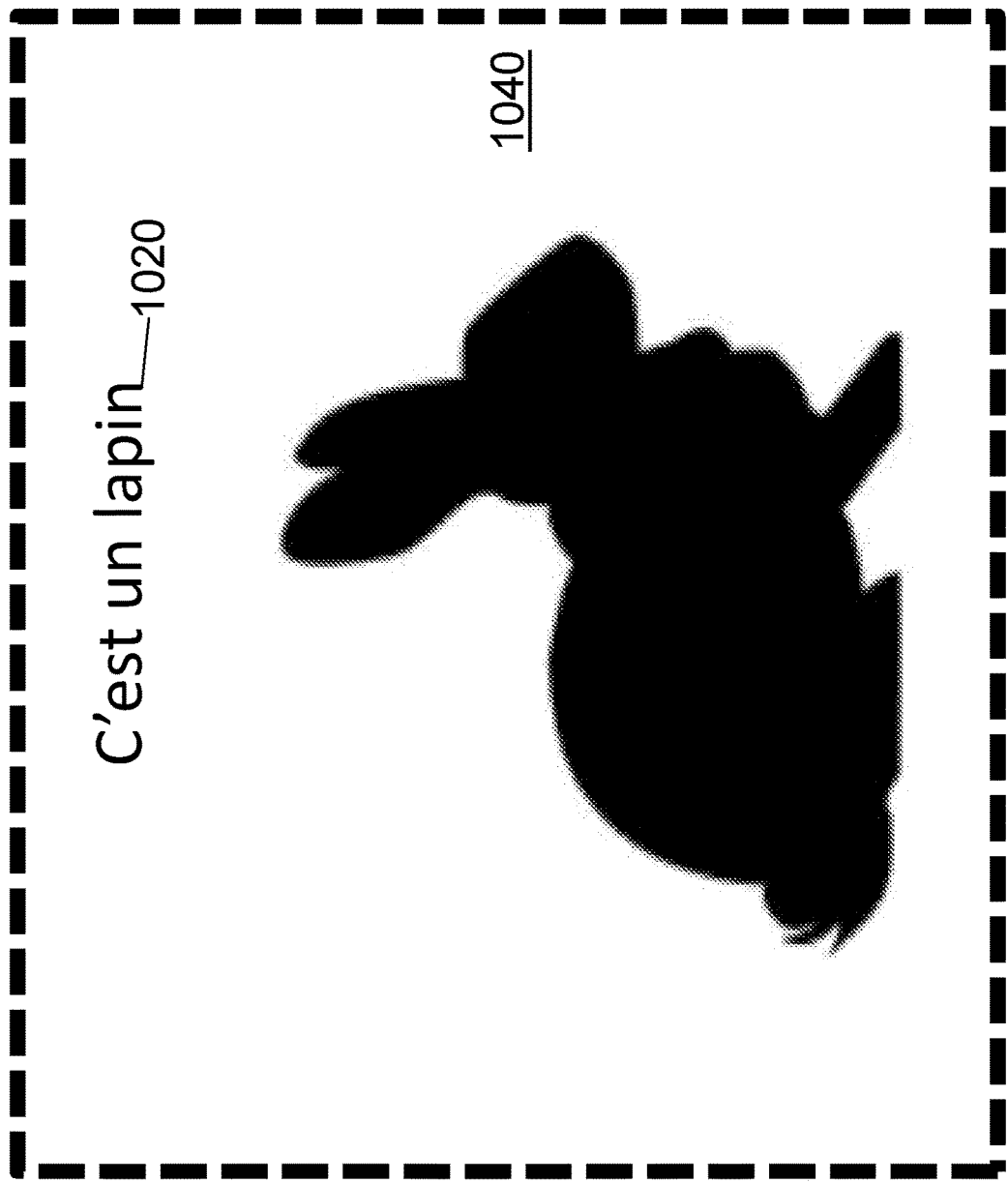
FIG. 10 illustrates a graphical user interface generated and displayed in an automated image translation system, according to an embodiment.

FIG. 10 illustrates a graphical user interface generated and displayed in an automated image translation system, according to an embodiment. After detecting a changed in a shared visual region, the system may use OCR to find text in the shared visual region and sample the text to determine location, font, color, and background in the text region. The system may use machine translation to translate the text into the preferred language. The system may then overlay the translated text over the original text, matching the font, color, style, and background of the original text. As shown in FIG. 10, text 1020 has been translated (from text 920 in FIG. 9), and text 1020 appears in the place of text 920 in the shared visual region 1040. The text 1020 may be presented as an overlay that covers the original text 920. In this example, the text 1020 resembles the font, color, style, and background of the original text 920.

Figure 11:
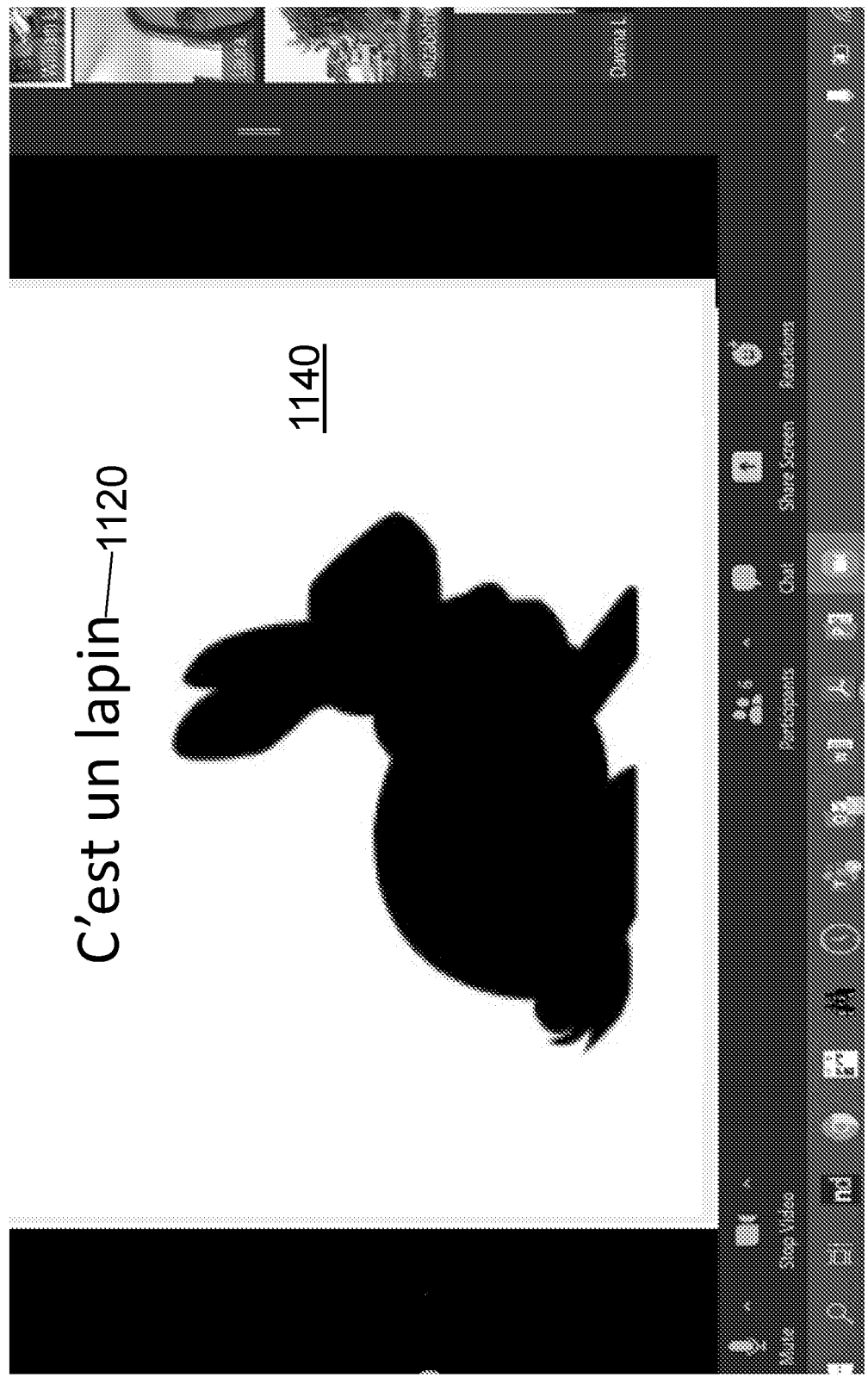
FIG. 11 illustrates a graphical user interface generated and displayed in an automated image translation system, according to an embodiment.

FIG. 11 illustrates a graphical user interface generated and displayed in an automated image translation system, according to an embodiment. In this example, text 1120 (resembling text 1020 from FIG. 10) and an image (a rabbit from FIG. 10) are shown on a shared visual region 1140 within an electronic meeting session platform. The examples illustrated in FIGS. 5-10 are intended to show only the shared visual region that is assessed for determining content changes and translation of text, but the shared visual region may be a portion of the electronic meeting session platform.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

I claim:

1. A method comprising:
    identifying, by a processor executing a machine-learning model, visual presentation content shared by a first electronic device of a first participant to a second electronic device of a second participant and a third electronic device of a third participant during an electronic communication session;
    decoupling, by the processor, using an image segmentation protocol, a region of the visual presentation content from other visual elements shared during the electronic communication session;
    executing an image recognition protocol on the region and not the other visual elements to identify a first set of words of the visual presentation content displayed within the region, wherein the first set of words is in a first language;
    identifying, by the processor, a second preferred language of the second participant of the electronic communication session and a third preferred language of the third participant of the electronic communication session;
    presenting, by the processor as a first overlay on at least a portion of the region during the electronic communication session on the second electronic device associated with the second participant, a second set of words in the second preferred language of the second participant, the second set of words corresponding to the first set of words;
    presenting, by the processor as a second overlay on at least a portion of the region during the electronic communication session on the third electronic device associated with the third participant, a third set of words in the third preferred language of the third participant, the third set of words corresponding to the first set of words;
    monitoring, by the processor, a set of pixels within the region to identify a visual revision within the region that satisfies a threshold of pixel differentiation between the set of pixels in a first pixel capture and the set of pixels in a second pixel capture; and in response to identifying the visual revision:
  executing, by the processor, the image recognition protocol to identify a fourth set of words within the region having the visual revision, wherein the fourth set of words is in the first language;
  presenting, by the processor within the first overlay on the second electronic device, a fifth set of words, in the second preferred language, corresponding to the fourth set of words; and
  presenting, by the processor within the second overlay on the third electronic device, a sixth set of words, in the third preferred language, corresponding to the fourth set of words.

2. The method of claim 1, wherein the processor presents at least one of the first set of words or the second set of words in real time.

3. The method of claim 1, wherein the machine-learning model is trained to identify the visual presentation content based on a color difference between the visual presentation content and other visual elements shared during the electronic communication session.

4. The method of claim 1, further comprising:
presenting, by the processor within the second overlay, an identification of a presenter sharing the visual presentation content during the electronic communication session.

5. The method of claim 1, further comprising:
presenting, by the processor within the second overlay, a transcript of an audio shared during the electronic communication session.

6. The method of claim 1, wherein the visual revision is a change in the first set of words.

7. The method of claim 1, further comprising identifying a set of pixels forming the first set of words.

8. The method of claim 7, wherein the set of pixels monitored comprise at least a subset of the pixels used to form the first set of words.

9. A computer system comprising:
a server comprising a processor and a non-transitory computer-readable medium containing instructions that when executed by the processor causes the processor to perform operations comprising:
  identify visual presentation content shared by a first electronic device of a first participant to a second electronic device of a second participant and a third electronic device of a third participant during an electronic communication session;
  decouple, using an image segmentation protocol, a region of the visual presentation content from other visual elements shared during the electronic communication session;
  execute an image recognition protocol on the region and not the other visual elements to identify a first set of words of the visual presentation content displayed within the region, wherein the first set of words is in a first language;
  identify a second preferred language of the second participant of the electronic communication session and a third preferred language of the third participant of the electronic communication session;
  present as a first overlay on at least a portion of the region during the electronic communication session on the second electronic device associated with the second participant, a second set of words in the second preferred language of the second participant, the second set of words corresponding to the first set of words;
  present as a second overlay on at least a portion of the region during the electronic communication session on the third electronic device associated with the third participant, a third set of words in the third preferred language of the third participant, the third set of words corresponding to the first set of words;
  monitor a set of pixels within the region to identify a visual revision within the region that satisfies a threshold of pixel differentiation between the set of pixels in a first pixel capture and the set of pixels in a second pixel capture; and
  in response to identifying the visual revision:
    identify a fourth set of words within the region having the visual revision, wherein the fourth set of words is in the first language;
    present within the first overlay on the second electronic device, a fifth set of words, in the second preferred language, corresponding to the fourth set of words; and
    present within the second overlay on the third electronic device, a sixth set of words, in the third preferred language, corresponding to the fourth set of words.

10. The computer system of claim 9, wherein the processor presents at least one of the first set of words or the second set of words in real time.

11. The computer system of claim 9, wherein the instructions cause the processor to execute a machine-learning model to generate the second set of words.

12. The computer system of claim 9, wherein the visual presentation content is identified based on a color difference between the visual presentation content and other visual elements shared during the electronic communication session.

13. The computer system of claim 9, wherein the instructions cause the processor to present within the first overlay a transcript of an audio shared during the electronic communication session.

14. The computer system of claim 9, wherein the visual revision is a change in the first set of words.

15. The computer system of claim 9, wherein the instructions cause the processor to identify a set of pixels forming the first set of words.

16. The computer system of claim 15, wherein the set of pixels monitored comprise at least a subset of the pixels used to form the first set of words.

17. A computer system comprising:
a processor in communication with a machine-learning model and an electronic device, the processor configured to:
  identify visual presentation content shared a first electronic device of a first participant to a second electronic device of a second participant and a third electronic device of a third participant during an electronic communication session;
  decouple, using an image segmentation protocol, a region of the visual presentation content from other visual elements shared during the electronic communication session;
  execute an image recognition protocol on the region and not the other visual elements to identify a first set of words of the visual presentation content displayed within the region, wherein the first set of words is in a first language;

identify a second preferred language of the second participant of the electronic communication session and a third preferred language of the third participant of the electronic communication session;

present as a first overlay on at least a portion of the region during the electronic communication session on the second electronic device associated with the second participant, a second set of words in the second preferred language, the second set of words corresponding to the first set of words;

present as a second overlay on at least a portion of the region during the electronic communication session on the third electronic device associated with the third participant, a third set of words in the third preferred language of the third participant, the third set of words corresponding to the first set of words;

monitor a set of pixels within the region to identify a visual revision within the region that satisfies a threshold of pixel differentiation between the set of pixels in a first pixel capture and the set of pixels in a second pixel capture; and in response to identifying the visual revision:

identify a fourth set of words within the region having the visual revision, wherein the fourth set of words is in the first language;

present within the first overlay on the second electronic device, a fifth set of words, in the second preferred language, corresponding to the fourth set of words; and present within the second overlay on the third electronic device, a sixth set of words, in the third preferred language, corresponding to the fourth set of words.

18. The computer system of claim 17, wherein the processor presents at least one of the first set of words or the second set of words in real time.

19. The computer system of claim 17, wherein the machine-learning model is trained to identify the visual presentation content based on a color difference between the visual presentation content and other visual elements shared during the electronic communication session.

20. The computer system of claim 17, wherein the processor presents within the first overlay a transcript of an audio shared during the electronic communication session.

* * * * *